United States Patent
Johnson et al.

(10) Patent No.: US 12,161,963 B2
(45) Date of Patent: Dec. 10, 2024

(54) EXTRACTING WATER VAPOR FROM A POWERPLANT EXHAUST

(71) Applicant: Raytheon Technologies Corporation, Farmington, CT (US)

(72) Inventors: Andressa L. Johnson, Kailua, HI (US); Neil J. Terwilliger, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 266 days.

(21) Appl. No.: 17/943,817

(22) Filed: Sep. 13, 2022

(65) Prior Publication Data
US 2024/0082750 A1    Mar. 14, 2024

(51) Int. Cl.
*B01D 5/00* (2006.01)
*B64D 33/04* (2006.01)

(52) U.S. Cl.
CPC ......... *B01D 5/0006* (2013.01); *B01D 5/0081* (2013.01); *B01D 5/009* (2013.01); *B64D 33/04* (2013.01); *B01D 2259/4575* (2013.01)

(58) Field of Classification Search
CPC .... B01D 5/0006; B01D 5/0081; B01D 5/009; B64D 33/04
See application file for complete search history.

(56) References Cited

U.S. PATENT DOCUMENTS

| | | | |
|---|---|---|---|
| 3,799,249 A * | 3/1974 | Linhardt | F17C 9/02 261/153 |
| 5,014,508 A | 5/1991 | Lifka | |
| 5,052,176 A | 10/1991 | Labatut | |
| 7,134,269 B2 * | 11/2006 | Walsh | F02C 7/10 60/39.511 |
| 7,721,524 B2 | 5/2010 | Jahnsen | |
| 7,971,438 B2 * | 7/2011 | Taylor | F02C 7/10 60/39.511 |

(Continued)

FOREIGN PATENT DOCUMENTS

| | | |
|---|---|---|
| EP | 0634563 A1 | 1/1995 |
| EP | 3048281 B1 | 4/2017 |

(Continued)

OTHER PUBLICATIONS

Sarah Qureshi, Contrail-Free Aero-Engines, Cranfield University, School of Aerospace Transport and Manufacturing Aerospace Propulsion, 2016. (Year: 2016).*

(Continued)

*Primary Examiner* — David P. Olynick
(74) *Attorney, Agent, or Firm* — Getz Balich LLC (57) ABSTRACT

A powerplant is provided that includes a flowpath, a combustor and a water extraction system. The combustor is configured to generate combustion products and direct the combustion products through the flowpath. The combustion products are configured from or otherwise include water vapor. The water extraction system is arranged with the flowpath downstream of the combustor. The water extraction system includes a condensation seeder and a collector. The condensation seeder is configured to direct a plurality of small water droplets into the flowpath to promote condensation of the water vapor to grow the small water droplets into a plurality of large water droplets. The collector is configured to collect the large water droplets.

19 Claims, 7 Drawing Sheets

(56) References Cited

U.S. PATENT DOCUMENTS

| | | |
|---|---|---|
| 8,833,701 B2 | 9/2014 | Bright |
| 11,904,272 B2* | 2/2024 | Klingels ............... B01D 5/0081 |
| 2002/0073712 A1* | 6/2002 | Kopko .................. F02C 7/1435 |
| | | 60/39.181 |
| 2021/0001269 A1 | 1/2021 | Klingels |
| 2021/0207500 A1* | 7/2021 | Klingels ................. F02C 3/305 |
| 2021/0285851 A1 | 9/2021 | Farouz-Fouquet |

FOREIGN PATENT DOCUMENTS

| | | |
|---|---|---|
| GB | 870268 A | 6/1961 |
| GB | 2190964 A | 12/1987 |
| GB | 2531629 B | 1/2017 |
| RU | 2561757 C1 | 9/2015 |

OTHER PUBLICATIONS

EP Search Report for EP Patent Application No. 23197158.1 dated Mar. 6, 2024.

\* cited by examiner

EXTRACTING WATER VAPOR FROM A POWERPLANT EXHAUST

BACKGROUND OF THE DISCLOSURE

1. Technical Field

This disclosure relates generally to a powerplant and, more particularly, to combustion products exhausted from the powerplant. The powerplant may include an aircraft powerplant, an industrial powerplant, or any other type of power generation system.

2. Background Information

As government emissions standards tighten, interest in alternative fuels for gas turbine engines continues to grow. There is interest, for example, in fueling a gas turbine engine with hydrogen ($H_2$) rather than a traditional hydrocarbon fuel such as kerosine to reduce greenhouse emissions. While various hydrogen fueled gas turbine engines are known in the art, there is still room in the art for improvement. For example, additional water vapor may be exhausted from a hydrogen fueled gas turbine engine. Introduction of this water vapor into an environment outside of an aircraft may contribute to formation of a contrail downstream of the aircraft. It has been theorized that contrails may contribute to global warming. There is a need in the art therefore for systems and method which can reduce contrail formation.

SUMMARY OF THE DISCLOSURE

According to an aspect of the present disclosure, a powerplant is provided that includes a flowpath, a combustor and a water extraction system. The combustor is configured to generate combustion products and direct the combustion products through the flowpath. The combustion products are configured from or otherwise include water vapor. The water extraction system is arranged with the flowpath downstream of the combustor. The water extraction system includes a condensation seeder and a collector. The condensation seeder is configured to direct a plurality of small water droplets into the flowpath to promote condensation of the water vapor to grow the small water droplets into a plurality of large water droplets. The collector is configured to collect the large water droplets.

According to another aspect of the present disclosure, another powerplant is provided that includes a flowpath, a combustor and a water extraction system. The combustor is configured to generate combustion products using non-hydrocarbon fuel and to direct the combustion products through the flowpath. The water extraction system is configured to extract water vapor from the combustion products. The water extraction system includes a plurality of nozzles configured to direct water droplets into the flowpath.

According to still another aspect of the present disclosure, a method is provided for operating a powerplant. During this method, fuel is combusted within a combustor to provide combustion products. Water vapor is extracted from the combustion products downstream of the combustor. The extracting of the water vapor includes: introducing a plurality of small water droplets into a flowpath to promote condensation of the water vapor within the flowpath and to grow the small water droplets with the condensing water vapor into a plurality of large water droplets; and collecting the large water droplets for removal from the flowpath.

The fuel may be configured as or otherwise include non-hydrocarbon fuel.

The water extraction system may be configured to direct the water droplets into the flowpath using the nozzles to promote condensation of the water vapor to grow the water droplets into a plurality of larger water droplets. The water extraction system may be configured collect the larger water droplets for removal from the flowpath.

The flowpath may extend axially along an axial centerline. The condensation seeder may include a nozzle configured to direct at least some of the small water droplets into the flowpath along a trajectory tangent to a reference line extending circumferentially about the axial centerline.

The flowpath may extend axially along an axial centerline. The condensation seeder may include a nozzle configured to direct at least some of the small water droplets into the flowpath along a trajectory angularly offset from the axial centerline.

The trajectory may be perpendicular to the axial centerline.

The trajectory may be angularly offset from the axial centerline by an acute angle.

The flowpath may extend axially along an axial centerline. The condensation seeder may include a plurality of nozzles configured to direct the small water droplets into the flowpath. The nozzles may include a first nozzle and a second nozzle axially spaced from the first nozzle along the axial centerline.

The collector may include one or more fins and/or one or more coils.

The collector may be configured as or otherwise include a centrifugal water-gas separator.

The powerplant may also include a reservoir configured to receive water from the collector. The water may include the large water droplets.

The powerplant may also include a heater configured to heat water provided to the condensation seeder for forming the small water droplets.

The powerplant may also include a cooler configured to cool water provided to the condensation seeder for forming the small water droplets.

The powerplant may also include a turbine rotor arranged along the flowpath downstream of the combustor. The water extraction system may be arranged with the flowpath between the combustor and the turbine rotor.

The powerplant may also include a turbine rotor arranged along the flowpath between the combustor and the water extraction system.

The powerplant may also include a first turbine rotor and a second turbine rotor. The first turbine rotor may be arranged along the flowpath downstream of the combustor. The second turbine rotor may be arranged along the flowpath downstream of the first turbine rotor. The water extraction system may be arranged with the flowpath between the first turbine rotor and the second turbine rotor.

The powerplant may also include a fuel system configured to direct hydrogen fuel into the combustor for combustion to generate the combustion products.

The powerplant may also include a control system configured to: monitor conditions entering the water extraction system; monitor a quantity of water extracted from the combustion products by the water extraction system; and adjust water pressure and/or flow rate to the condensation seeder to control a condensation rate of the water vapor.

The powerplant may also include a heat exchanger arranged with the flowpath upstream of the condensation seeder. The heat exchanger may be configured to cool or otherwise condition the combustion products directed through the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
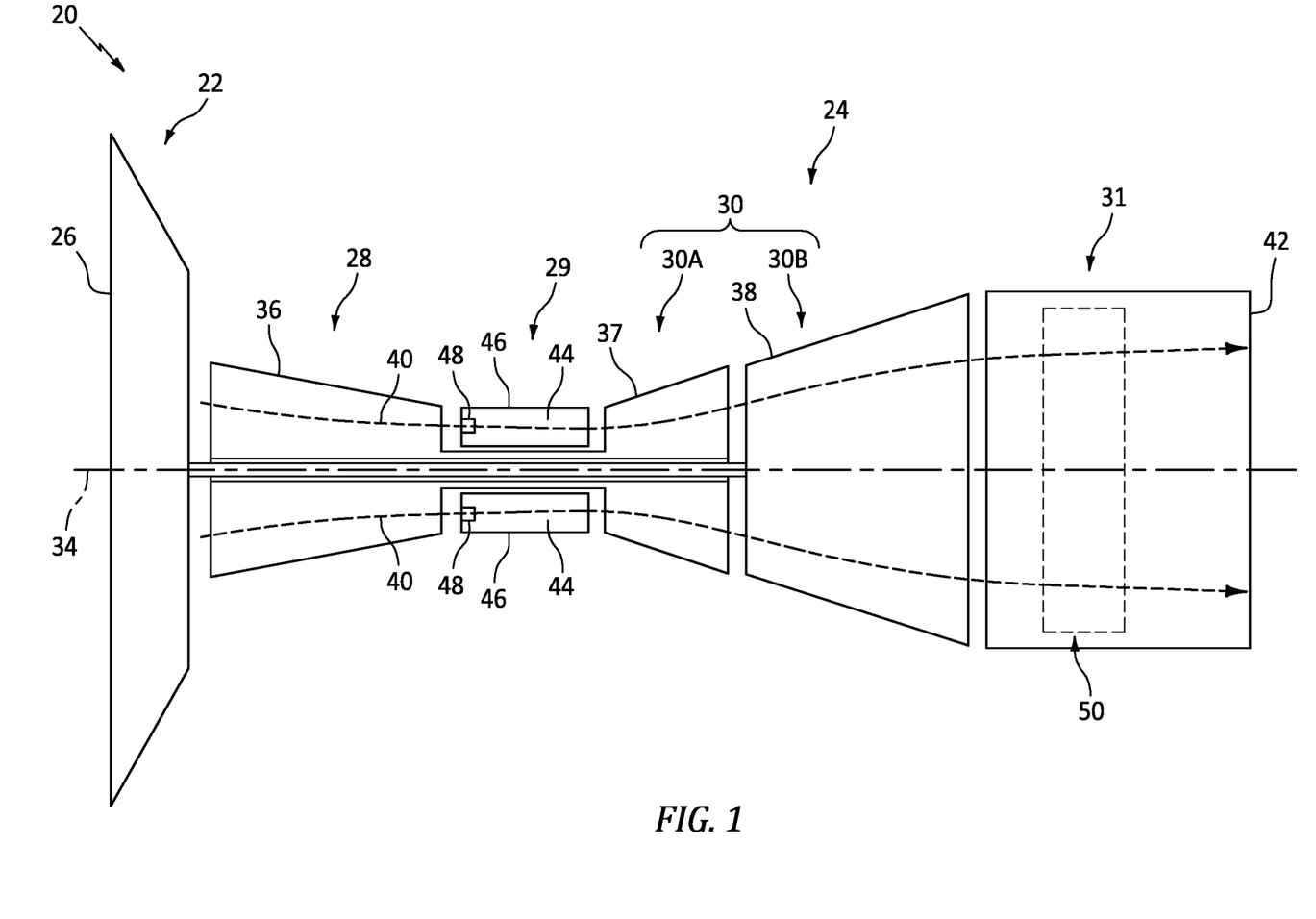
FIG. 1 is a schematic illustration of a powerplant.

FIG. 1 is a schematic illustration of a powerplant 20 such as, but not limited to, an aircraft powerplant. For example, this powerplant 20 may be configured as, or otherwise included as part of, a propulsion system for an aircraft. For another example, the powerplant 20 may additionally or alternatively be configured as, or otherwise included as part of, an electrical power system for the aircraft.

The powerplant 20 may be configured as a non-hydrocarbon powerplant/a hydrocarbon free powerplant; e.g., a powerplant that does not use (or require) hydrocarbon fuel for powerplant operation such as, but not limited to, kerosine, jet fuel, etc. The powerplant 20 of FIG. 1, for example, is configured as a hydrogen fueled powerplant. The present disclosure, however, is not limited to hydrogen fueled powerplants nor to non-hydrocarbon powerplants. The powerplant 20, for example, may also or alternatively be fueled one or more other non-hydrocarbon fuels such as ammonia ($NH_3$). The powerplant 20 may still also or alternatively be fueled using any other fuel, including hydrocarbon fuels, which produces combustion products that include water ($H_2O$) vapor.

The powerplant 20 includes a mechanical load 22 and a powerplant engine 24. The mechanical load 22 may be configured as or otherwise include at least one driven rotor 26. The mechanical load 22, for example, may be configured as a bladed propulsor rotor for an aircraft propulsion system. Examples of the propulsor rotor include, but are not limited to, a propeller for a propeller engine (e.g., a turboprop engine), a fan for a ducted fan engine (e.g., a turbofan engine), and an open rotor for an open rotor engine (e.g., a pusher fan engine, an open tractor rotor engine, etc.). The mechanical load 22 may alternatively be configured as a generator rotor in an electrical power generator for the power system. The present disclosure, however, is not limited to the foregoing exemplary mechanical loads nor the foregoing exemplary powerplant configurations.

The engine 24 may be configured as a gas turbine engine. The engine 24 of FIG. 1, for example, includes a compressor section 28, a combustor section 29, a turbine section 30 and an exhaust section 31. The turbine section 30 of FIG. 1 includes a high pressure turbine (HPT) section 30A and a low pressure turbine (LPT) section 30B; e.g., a power turbine section, a free turbine section, etc. The mechanical load 22, the compressor section 28, the combustor section 29, the HPT section 30A, the LPT section 30B and the exhaust section 31 of FIG. 1 are arranged sequentially along an axial centerline 34 of the powerplant 20 and its engine 24, which axial centerline 34 may also be a rotational axis for rotors within the powerplant sections 22, 28, 30A and 30B.

Each of the powerplant sections 28, 30A and 30B includes a respective bladed rotor 36-38. The driven rotor 26 is connected to and rotatably driven by the LPT rotor 38 through a low speed drivetrain; e.g., a shaft. The compressor rotor 36 is connected to and rotatably driven by the HPT rotor 37 through a high speed drivetrain; e.g., a shaft.

During powerplant operation, air is directed (e.g., through the driven rotor 26 such as a propulsor rotor) into a core flowpath 40. The core flowpath 40 extends sequentially through the compressor section 28, the combustor section 29, the HPT section 30A, the LPT section 30B and the exhaust section 31 to an exhaust nozzle 42. The air entering the core flowpath 40 may be referred to as core air.

The core air is compressed by the compressor rotor 36 and directed into a (e.g., annular) combustion chamber 44 of a (e.g., annular) combustor 46 in the combustor section 29. Fuel (e.g., non-hydrocarbon fuel such as hydrogen) is injected into the combustion chamber 44 via one or more fuel injectors 48 of a fuel system, and mixed with the compressed core air to provide a fuel-air mixture. This fuel-air mixture is ignited and combustion products thereof flow through and sequentially cause the HPT rotor 37 and the LPT rotor 38 to rotate. The combustion products are subsequently exhausted from the powerplant 20 and its engine 24 through the exhaust nozzle 42, which may provide powerplant thrust. The rotation of the HPT rotor 37 drives rotation of the compressor rotor 36 and, thus, compression of the air entering the core flowpath 40. The rotation of the LPT rotor 38 drives rotation of the driven rotor 26. Where the driven rotor 26 is configured as the propulsor rotor, the rotation of the driven rotor 26 may propel another airflow (e.g., a bypass airflow) through (e.g., internal to) and/or along (e.g., external to) the powerplant 20 and its engine 24 to provide additional powerplant thrust. Where the driven rotor 26 is configured as the generator rotor, the rotation of the driven rotor 26 may facilitate generation of electricity by the electrical power generator.

The combustion products exhausted by the powerplant 20 and its engine 24 may include relatively warm water ($H_2O$) vapor. Under certain environmental conditions (e.g., pressure, temperature, humidity, etc.), this warm water vapor may contribute to formation of a contrail in the ambient environment outside of/downstream of the powerplant 20 and, more generally, the aircraft. It has been theorized that contrails may contribute to global climate change. To reduce or eliminate the formation of such contrails, the powerplant 20 of FIG. 1 includes a water extraction system 50. This water extraction system 50 is configured to extract (e.g., recover) water from the combustion products to be exhausted from the powerplant 20 and its engine 24 upstream of the exhaust nozzle 42. By reducing or eliminating the water exhausted out of the exhaust nozzle 42, the water extraction system 50 may reduce or eliminate matter which contributes to/produces contrails. In addition or alternatively, the water extraction system 50 may facilitate water conservation. The extracted water, for example, may be recycled (e.g., reused) for continued engine operation. This may also reduce water storage capacity requirements for the powerplant 20 where water, for example, is used for engine cooling.

The water extraction system 50 may be configured as a condensation seeding system. The water extraction system 50 of FIG. 2, for example, includes a condensation seeder with one or more nozzles 52. This water extraction system 50 also includes a collector 54 and a water reservoir 56; e.g., a tank, a bladder, a cylinder, etc.

Figure 2:
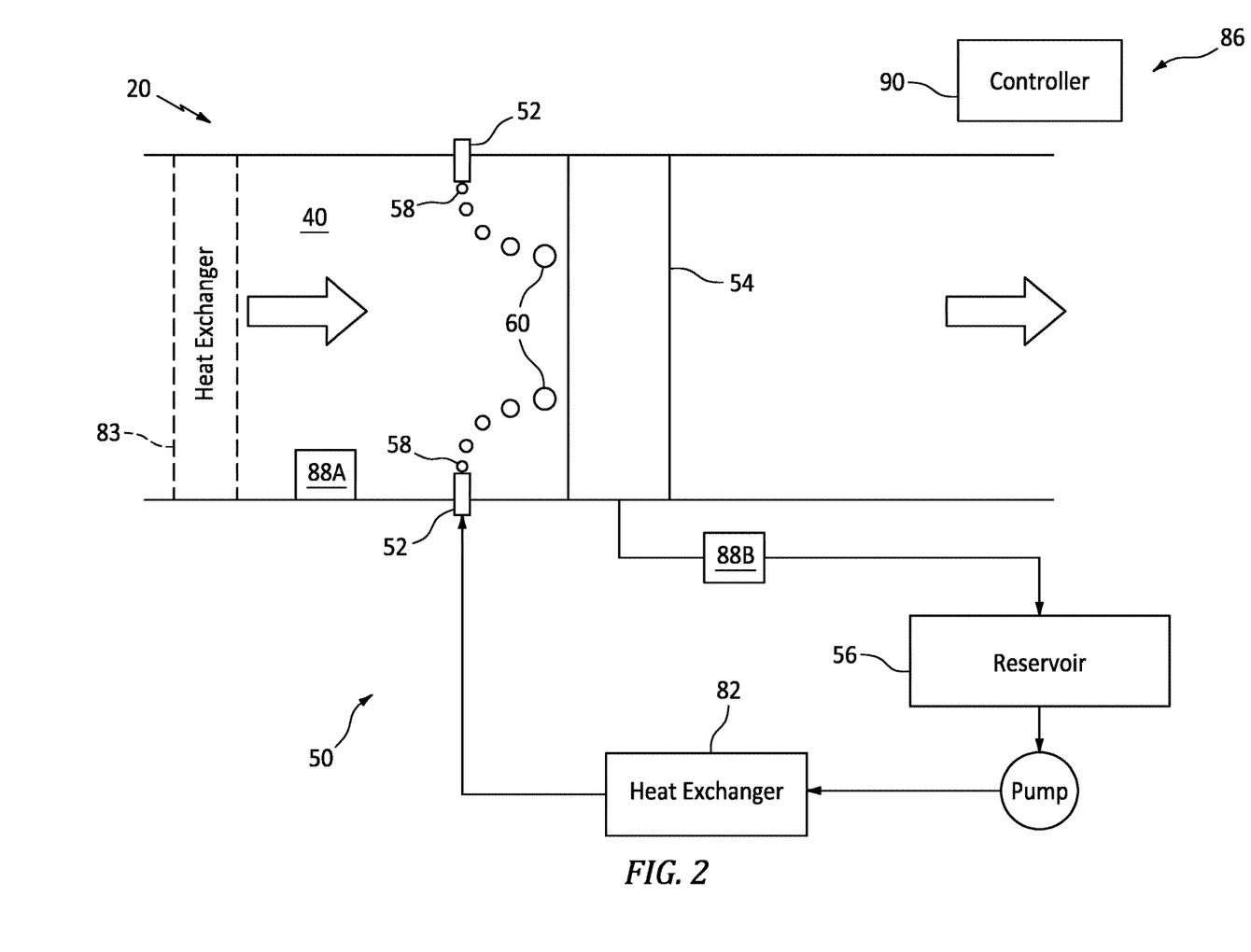
FIG. 2 is a schematic illustration of a water extraction system arranged with a flowpath of the powerplant.

The condensation seeder and its nozzles 52 are configured to direct (e.g., inject, spray, etc.) relatively small water droplets 58 into a (e.g., supersaturated) environment within the core flowpath 40. These small water droplets 58 may have a size (e.g., a radius) between, for example, 0.05 microns and 10 microns (e.g., 0.2 microns, 0.5 microns, etc.), although smaller and/or larger sizes are possible depending upon the environmental conditions within the core flowpath 40. The small water droplets 58 interact with (e.g., collide against, contact, etc.) the water vapor flowing with the combustion products through the core flowpath 40 to provide seed droplets for forming larger water droplets 60. The water vapor within the core flowpath 40, for example, may condense against the small water droplets 58 (e.g., seed droplets) and accumulate to grow the small water droplets 58 into relatively large water droplets 60. These large water droplets 60 may have a size (e.g., a radius) between, for example, 0.05 microns and 20 microns (e.g., 1 micron, 1.5 microns, etc.), although smaller and/or larger sizes are possible depending upon the environmental conditions within the core flowpath 40. The large water droplets 60 may then be collected by the collector 54 and directed out of the core flowpath 40 to the water reservoir 56.

Figure 3:
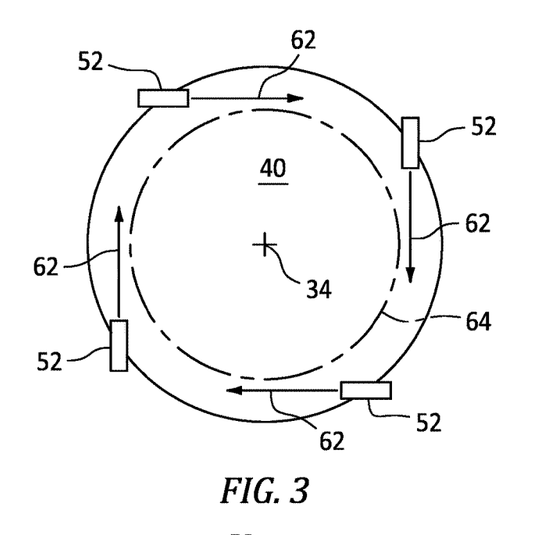
FIG. 3 is a cross-sectional schematic illustration of the flowpath arranged with nozzles for the water extraction system.
Figure 4A:
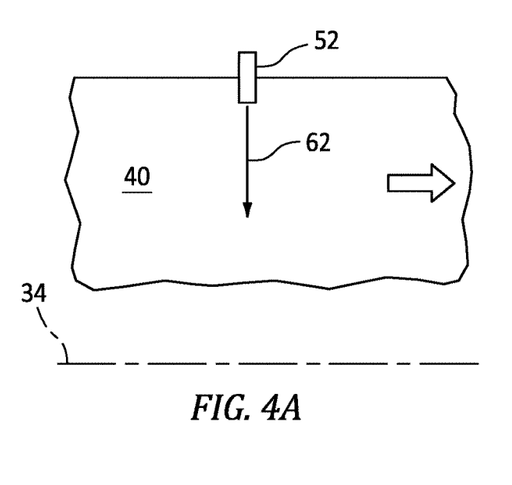
FIGS. 4A-C are side sectional schematic illustrations of a portion of the flowpath arranged with one of the nozzles in various arrangements.
Figure 4B:
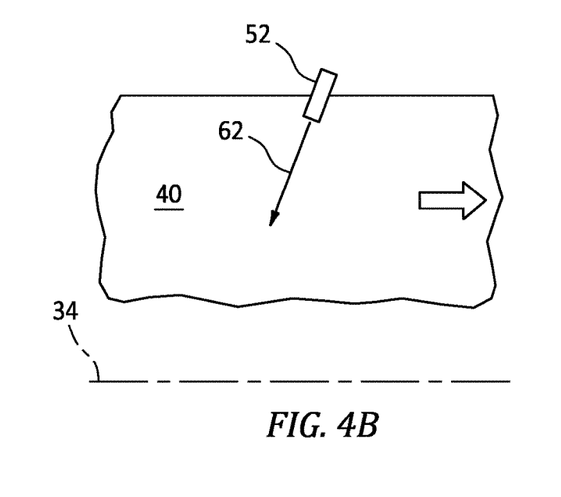
Figure 4C:
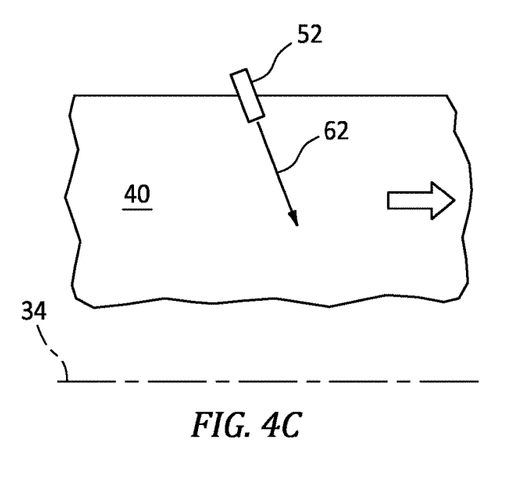

Referring to FIGS. 3 and 4A-C, each of the nozzles 52 is configured to direct a flow of the small water droplets 58 (see FIG. 2) into the core flowpath 40 along a respective trajectory 62. Referring to FIG. 3, the trajectory 62 for one, some or all of the nozzles 52 may be tangent to a (e.g., circular or arcuate) reference line 64 extending circumferentially about the axial centerline 34 when viewed, for example, in a reference plane perpendicular to the axial centerline 34. With such a nozzle arrangement, the small water droplets 58 may be swirled into the core flowpath 40. In addition or alternatively, referring to FIGS. 4A-C, the trajectory 62 for one, some or all of the nozzles 52 may be angularly offset from the axial centerline 34 when viewed, for example, in a reference plane parallel with (e.g., including) the axial centerline 34. The trajectory 62 of FIG. 4A, for example, is perpendicular to the axial centerline 34. The trajectory 62 of FIG. 4B, 4C is angularly offset from the axial centerline 34 by an acute angle. The trajectory 62 of FIG. 4B extends axially along the axial centerline 34 in an upstream direction. The trajectory 62 of FIG. 4C extends axially along the axial centerline 34 in a downstream direction. In some embodiments, each of the nozzles 52 may have a similarly trajectory orientation. In other embodiments, one or more of the nozzles 52 may have a different trajectory orientation than one or more of the other nozzles 52.

Figure 5:
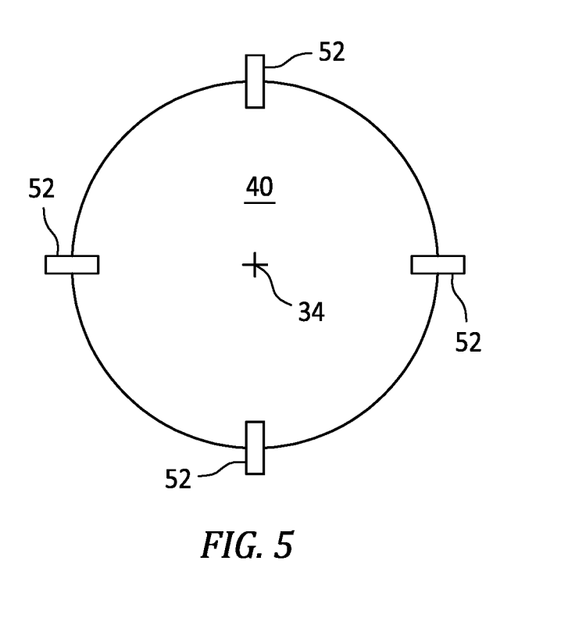
FIG. 5 is a cross-sectional schematic illustration of the flowpath arranged with an array of the nozzles.
Figure 6:
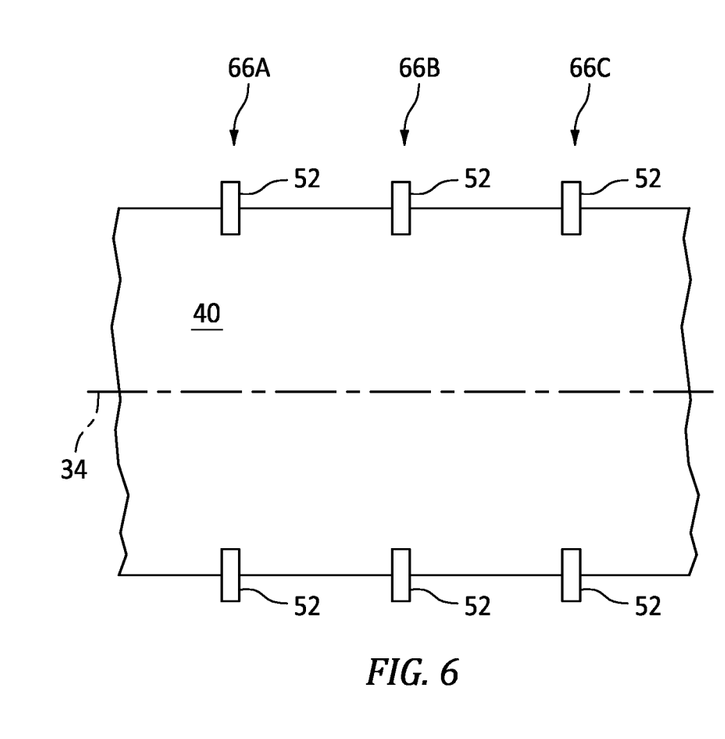
FIG. 6 is a side sectional schematic illustration of a portion of the flowpath arranged with multiple axial stages of the nozzles.

Referring to FIG. 5, some or all of the nozzles 52 may be axially aligned along the axial centerline 34. The nozzles 52 of FIG. 5, for example, are arranged in a single annular (e.g., circular) array about the axial centerline 34. In other embodiments however, referring to FIG. 6, the nozzles 52 may be disposed along the axial centerline 34 in different stages 66A-C (generally referred to as "66"). Each nozzle stage 66 may include a single one of the nozzles 52, or multiple of the nozzles 52 (e.g., in an array as shown in FIG. 5).

Figure 7:
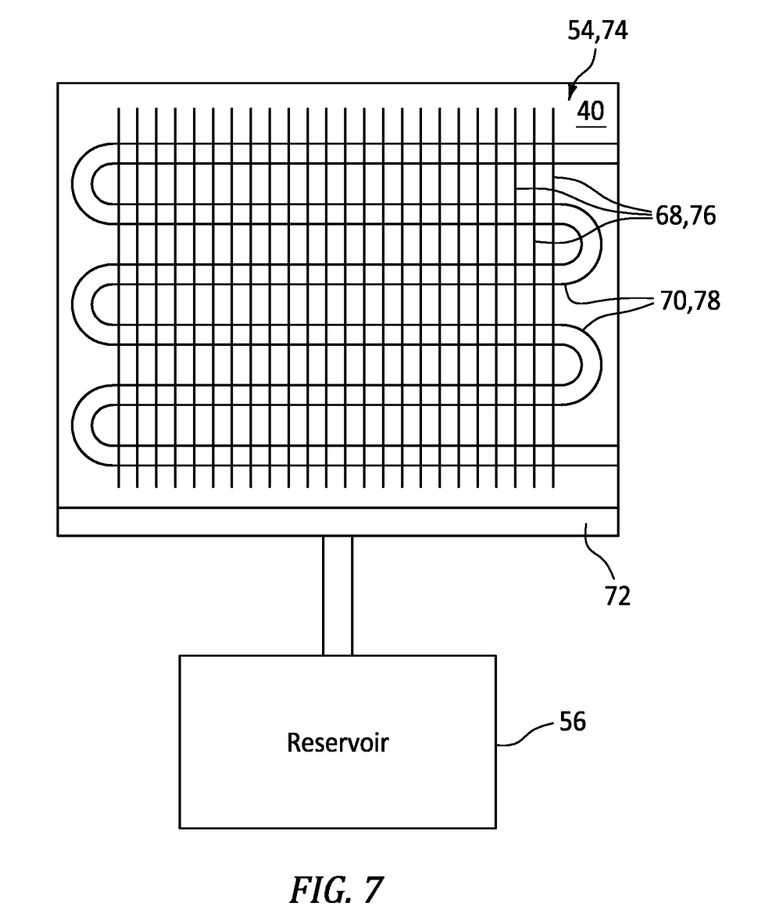
FIG. 7 is a schematic illustration of a portion of the powerplant with a heat exchanger within the flowpath.

Referring to FIG. 7, the collector 54 may include one or more collection surfaces 68 and 70 and a gutter 72; e.g., a sump. The large water droplets 60 (see FIG. 2) grown within the core flowpath 40 may contact (e.g., impinge against) and accumulate on the collection surfaces 68 and 70. The collection surfaces 68 and 70 may then direct the accumulated water towards the water reservoir 56 by way of the gutter 72.

Figure 8:
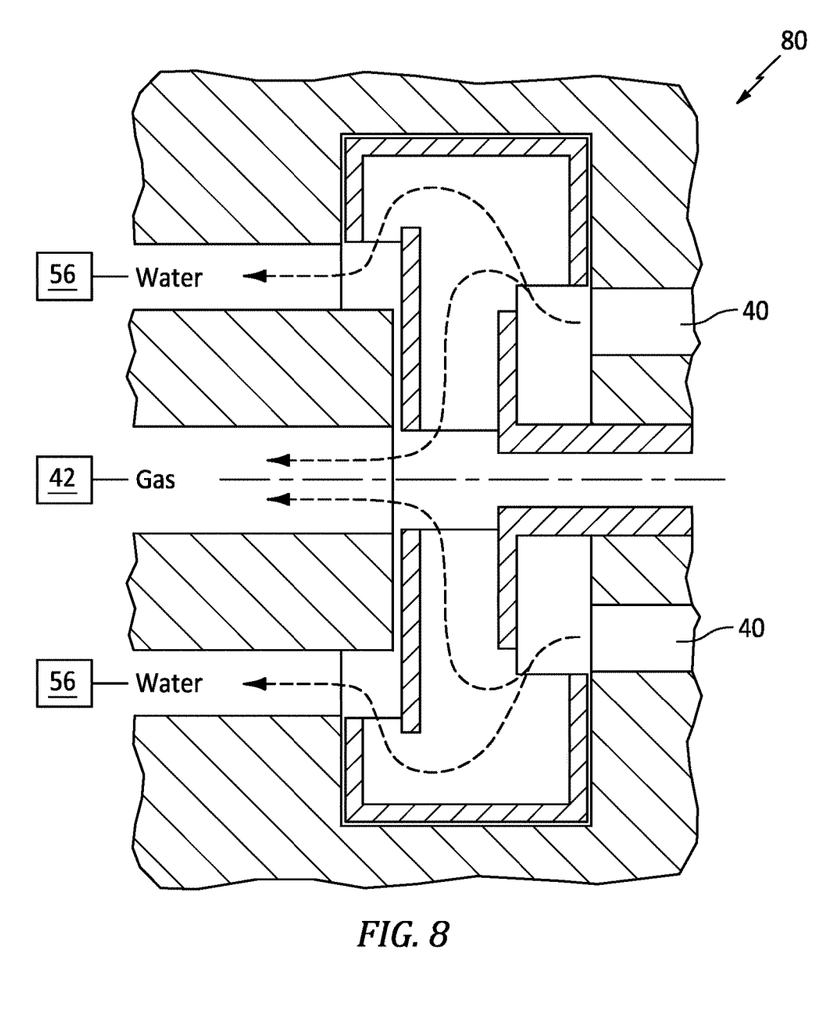
FIG. 8 is a side sectional illustration of a portion of the powerplant with a centrifugal water-gas separator.

The collector 54 may be configured as or otherwise include a heat exchanger 74. This heat exchanger 74 may include one or more fins 76 and/or one or more coils 78, which fins 76 and/or which coils 78 may respectively form the collection surfaces 68 and 70. This heat exchanger 74 may further promote condensation of the water vapor flowing within the core flowpath 40. Additional water vapor, for example, may condense against the fins 76 and/or the coils 78 of the heat exchanger 74, and this condensed water vapor (now liquid water) may be directed to the water reservoir 56 by way of the gutter 72. The heat exchanger 74 may thereby supplement the water extraction performed by the introduction of the small water droplets 58 (e.g., seed droplets; see FIG. 2) into the core flowpath 40, or vice versa. In other embodiments however, referring to FIG. 8, the collector 54 may also or alternatively include centrifugal water-gas separator 80; e.g., a centrifugal liquid-gas separator. Various types and configurations of centrifugal water-gas separators/centrifugal liquid-gas separators are known in the art, and the present disclosure is not limited to any particular ones thereof.

In some embodiments, referring to FIG. 2, some of the water received by the water reservoir 56 may be reused for injection into the core flowpath 40 by the nozzles 52 as the small water droplets 58.

In some embodiments, the water extraction system 50 may include a system heat exchanger 82 configured to condition the water provided to the nozzles 52. The system heat exchanger 82, for example, may be configured as a cooler for cooling the water provided to the nozzles 52. Alternatively, the system heat exchanger 82 may be configured as a heater for heating the water provided to the nozzles 52.

In some embodiments, the water extraction system 50 may also include a flowpath heat exchanger 83. This flowpath heat exchanger 83 is arranged with (e.g., within) the core flowpath 40. The flowpath heat exchanger 83 is configured to cool the combustion products and its relatively warm water vapor prior to injection of the water droplets 58 by the condensation seeder and its nozzles 52.

In some embodiments, the water extraction system 50 may also include a control system 86. The control system 86 of FIG. 2 includes one or more sensors 88A and 88B (generally referred to as "88") and a controller 90.

The sensor 88A is arranged with the core flowpath 40. This sensor 88A is configured to determined one or more environmental conditions within the core flowpath 40; e.g., relative humidity, temperature, pressure, etc.

The sensor 88B is arranged with or downstream of the collector 54. This sensor 88B is configured to determine a parameter of the water being extracted; e.g., a quantity of the extracted water.

The controller 90 is in signal communication (e.g., hardwired and/or wirelessly coupled) with the sensors 88 as well as any one or more of the components 52, 54, 82 and 83 (and/or device(s) which control operation of any one or more of the components 52, 54, 82 and 83). The controller 90 may be implemented with a combination of hardware and software. The hardware may include memory and at least one processing device, which processing device may include one or more single-core and/or multi-core processors. The hardware may also or alternatively include analog and/or digital circuitry other than that described above.

The control system 86 is configured to monitor conditions entering the water extraction system 50 and/or a quantity of the water extracted from the combustion products. The control system 86 is further configured to adjust seed water pressure and/or flow rate to the condensation seeder and its nozzles 52 in order to control a condensation rate of the water vapor.

Figure 9:
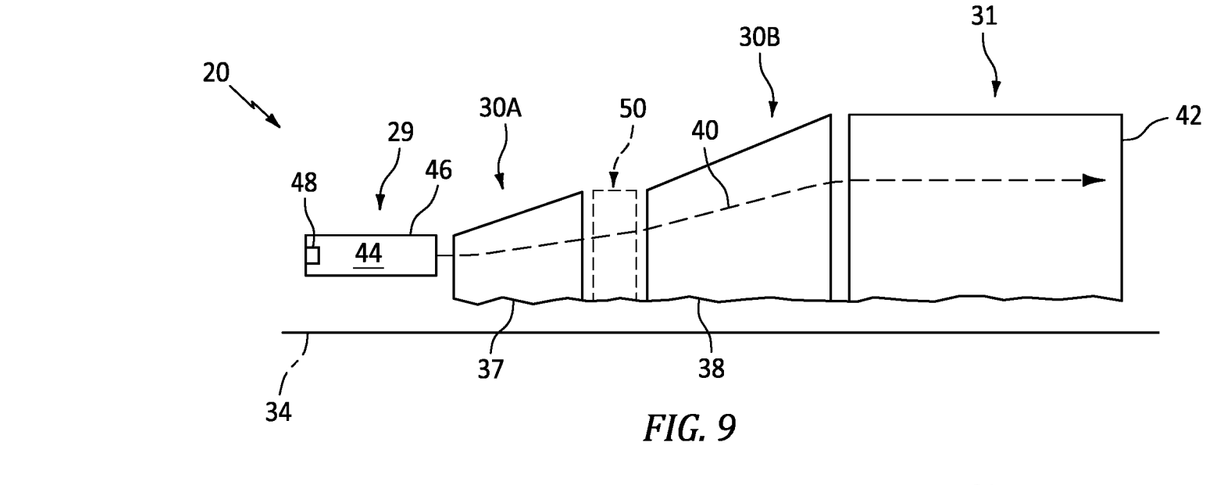
FIG. 9 is a partial schematic illustration of the powerplant with the water extraction system between turbine sections.
Figure 10:
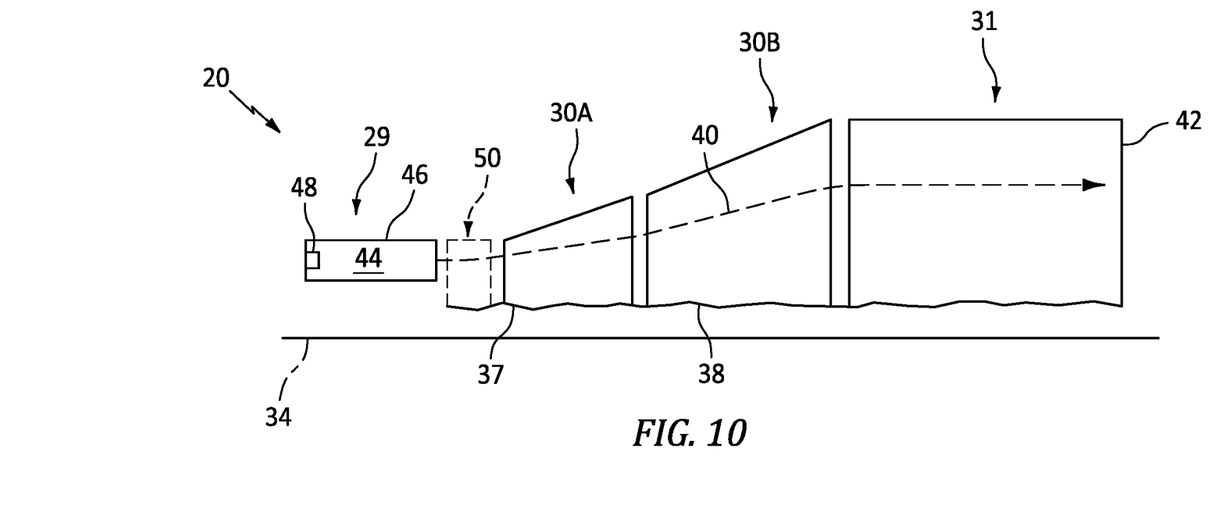
FIG. 10 is a partial schematic illustration of the powerplant with the water extraction system between a combustor section and a turbine section.

In some embodiments, referring to FIG. 1, the water extraction system 50 and its components 52 and 54 (see FIG. 2) may be arranged with the core flowpath 40 within the exhaust section 31. The water extraction system 50 and its components 52 and 54 are thereby located downstream of the turbine section 30, but upstream of the exhaust nozzle 42. However, in other embodiments, referring to FIGS. 9 and 10, the water extraction system 50 and its components 52 and 54 may be arranged upstream of the exhaust section 31, but still downstream of the combustor section 29 and its combustor 46. The water extraction system 50 and its components 52 and 54 of FIG. 9, for example, are arranged with the core flowpath 40 between the HPT rotor 37 and the LPT rotor 38. In another example, the water extraction system 50 and its components 52 and 54 of FIG. 10 are arranged with the core flowpath 40 between the combustor 46 and the HPT rotor 37.

The water extraction system 50 may be included in various powerplants other than the one described above. The water extraction system 50, for example, may be included in a geared powerplant where a gear train connects one or more shafts to one or more rotors. Alternatively, the water extraction system 50 may be included in a powerplant configured without a gear train. The water extraction system 50 may be included in a gas turbine engine configured with a single spool, with two spools (e.g., see FIG. 1), or with more than two spools. The gas turbine engine may be configured as a turbofan engine, a turbojet engine, a turboprop engine, a turboshaft engine, a propfan engine, a pusher fan engine or any other type of turbine engine. The gas turbine engine may alternatively be configured as an auxiliary power unit (APU). The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant, comprising:
a flowpath;
a combustor configured to generate combustion products and direct the combustion products through the flowpath, the combustion products including water vapor;
a water extraction system arranged with the flowpath downstream of the combustor, the water extraction system including a condensation seeder and a collector;
the condensation seeder configured to direct a plurality of small water droplets into the flowpath to promote condensation of the water vapor to grow the plurality of small water droplets into a plurality of large water droplets; and
the collector configured to collect the plurality of large water droplets; and
a control system configured to
monitor conditions entering the water extraction system;
monitor a quantity of water extracted from the combustion products by the water extraction system; and
adjust water pressure and/or flow rater to the condensation seeder to control a condensation rate of the water vapor.

2. The powerplant of claim 1, wherein
the flowpath extends axially along an axial centerline; and
the condensation seeder comprises a nozzle configured to direct at least some of the plurality of small water droplets into the flowpath along a trajectory tangent to a reference line extending circumferentially about the axial centerline.

3. The powerplant of claim 1, wherein
the flowpath extends axially along an axial centerline; and
the condensation seeder comprises a nozzle configured to direct at least some of the plurality of small water droplets into the flowpath along a trajectory angularly offset from the axial centerline.

4. The powerplant of claim 3, wherein the trajectory is perpendicular to the axial centerline.

5. The powerplant of claim 3, wherein the trajectory is angularly offset from the axial centerline by an acute angle.

6. The powerplant of claim 1, wherein
the flowpath extends axially along an axial centerline;
the condensation seeder includes a plurality of nozzles configured to direct the plurality of small water droplets into the flowpath; and
the plurality of nozzles include a first nozzle and a second nozzle axially spaced from the first nozzle along the axial centerline.

7. The powerplant of claim 1, wherein the collector comprises one or more fins and/or one or more coils.

8. The powerplant of claim 1, wherein the collector comprises a centrifugal water-gas separator.

9. The powerplant of claim 1, further comprising a reservoir configured to receive water from the collector, the water comprising the plurality of large water droplets.

10. The powerplant of claim 1, further comprising a heater configured to heat water provided to the condensation seeder for forming the plurality of small water droplets.

11. The powerplant of claim 1, further comprising a cooler configured to cool water provided to the condensation seeder for forming the plurality of small water droplets.

12. The powerplant of claim 1, further comprising:
a turbine rotor arranged along the flowpath downstream of the combustor;
the water extraction system arranged with the flowpath between the combustor and the turbine rotor.

13. The powerplant of claim 1, further comprising a turbine rotor arranged along the flowpath between the combustor and the water extraction system.

14. The powerplant of claim 1, further comprising:
- a first turbine rotor arranged along the flowpath downstream of the combustor; and
- a second turbine rotor arranged along the flowpath downstream of the first turbine rotor;
- the water extraction system arranged with the flowpath between the first turbine rotor and the second turbine rotor.

15. The powerplant of claim 1, further comprising a fuel system configured to direct hydrogen fuel into the combustor for combustion to generate the combustion products.

16. The powerplant of claim 1, further comprising a heat exchanger arranged with the flowpath upstream of the condensation seeder, the heat exchanger configured to cool the combustion products directed through the flowpath.

17. A powerplant, comprising:
- a flowpath;
- a combustor configured to generate combustion products using non-hydrocarbon fuel and direct the combustion products through the flowpath;
- a water extraction system configured to extract water vapor from the combustion products, the water extraction system comprising a plurality of nozzles configured to direct a plurality of water droplets into the flowpath; and
- a control system configured to
  - monitor conditions entering the water extraction system;
  - monitor a quantity of water extracted from the combustion products by the water extraction system; and
  - adjust water pressure and/or flow rater to a condensation seeder to control a condensation rate of the water vapor.

18. The powerplant of claim 17, wherein
- the water extraction system is configured to direct the plurality of water droplets into the flowpath using the plurality of nozzles to promote condensation of the water vapor to grow the plurality of water droplets into a plurality of larger water droplets; and
- the water extraction system is configured collect the plurality of larger water droplets for removal from the flowpath.

19. A method for operating a powerplant, comprising:
- combusting fuel within a combustor to provide combustion products; and
- extracting water vapor from the combustion products downstream of the combustor using a water extraction system, the extracting of the water vapor comprising
  - introducing a plurality of small water droplets into a flowpath to promote condensation of the water vapor within the flowpath and grow the plurality of small water droplets with the condensing water vapor into a plurality of large water droplets;
- collecting the plurality of large water droplets for removal from the flowpath;
- monitoring conditions entering the water extraction system;
- monitoring a quantity of water extracted from the combustion products by the water extraction system; and
- adjusting water pressure and/or flow rate to condensation seeder to control a condensation rate of the water vapor.

* * * * *